US010099552B2

(12) United States Patent
Long et al.

(10) Patent No.: US 10,099,552 B2
(45) Date of Patent: Oct. 16, 2018

(54) HYDRAULIC-ELECTRIC DRIVE ARRANGEMENT FOR WORK VEHICLES

(71) Applicant: Deere & Company, Moline, IL (US)

(72) Inventors: Randall L. Long, Coffeyville, KS (US); Dwayne B. Watt, Bartlesville, OK (US); G. William Detrick, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 11 days.

(21) Appl. No.: 15/282,093

(22) Filed: Sep. 30, 2016

(65) Prior Publication Data

US 2018/0093564 A1   Apr. 5, 2018

(51) Int. Cl.
*B60K 17/28* (2006.01)
*B60K 6/26* (2007.10)
(Continued)

(52) U.S. Cl.
CPC ............ *B60K 17/28* (2013.01); *B60K 6/26* (2013.01); *B60K 6/405* (2013.01); *B60K 8/00* (2013.01); *F16H 1/46* (2013.01); *F16H 57/082* (2013.01); *A01D 45/10* (2013.01); *B60K 25/02* (2013.01); *B60K 2025/022* (2013.01);
(Continued)

(58) Field of Classification Search
CPC .......... B60K 17/28; B60K 6/26; B60K 6/405; B60K 8/00; B60K 2025/022; B60K 25/02; F16H 57/082; F16H 1/46; B60Y 2200/222; B60Y 2400/73; A01D 45/10
See application file for complete search history.

(56) References Cited

U.S. PATENT DOCUMENTS 5,309,778 A * 5/1994 Antonov ................ B60K 6/26
   74/15.86
6,023,134 A  2/2000 Carl et al.
(Continued)

FOREIGN PATENT DOCUMENTS

DE     10303050 B4    5/2006
DE  102010004596 A1   7/2011
(Continued)

OTHER PUBLICATIONS

German Patent and Trade Mark Office, Search Report in German Patent Application No. 10 2017 215 089.0 dated May 8, 2018.

*Primary Examiner* — David J Hlavka
(74) *Attorney, Agent, or Firm* — Klintworth & Rozenblat IP LLP; Steven Wietrzny (57) ABSTRACT

A hydraulic-electric drive assembly for a work vehicle has a hydraulic pump drive including a manifold housing, a power input interface configured to couple with a prime mover for receiving rotational input power, and a plurality of power output interfaces coupled to the power input interface to transmit the input power from the prime mover mechanically at a first drive speed. At least one hydraulic pump is mounted to at least one of the power output interfaces to be driven by the input power from the prime mover. At least one electric generator is coupled to at least one of the power output interfaces to be driven by the input power from the prime mover. The at least one electric generator is configured to convert the input power from the prime mover into electric power.

17 Claims, 4 Drawing Sheets

(51) Int. Cl.
  *B60K 6/405* (2007.10)
  *B60K 8/00* (2006.01)
  *F16H 1/46* (2006.01)
  *F16H 57/08* (2006.01)
  *A01D 45/10* (2006.01)
  *B60K 25/02* (2006.01)

(52) U.S. Cl.
  CPC ..... *B60Y 2200/222* (2013.01); *B60Y 2400/73* (2013.01); *Y10S 903/906* (2013.01); *Y10S 903/952* (2013.01)

(56) References Cited

U.S. PATENT DOCUMENTS

| | | | |
|---|---|---|---|
| 8,454,326 B2 * | 6/2013 | Grosskopf | F16C 17/22 384/297 |
| 9,096,115 B2 | 8/2015 | Ho et al. | |
| 9,402,344 B1 | 8/2016 | Wenzel et al. | |
| 2011/0215588 A1 | 9/2011 | Gilbert, Jr. | |
| 2015/0008677 A1 | 1/2015 | Brock | |
| 2016/0129786 A1 * | 5/2016 | Petersen | B60K 17/28 74/11 |
| 2016/0145833 A1 * | 5/2016 | Abdel-Baqi | E02F 9/2217 180/53.4 |
| 2017/0001629 A1 * | 1/2017 | Vyncke | B60K 25/00 |
| 2017/0072778 A1 * | 3/2017 | Ornella | B60K 25/06 |

FOREIGN PATENT DOCUMENTS

| | | | |
|---|---|---|---|
| DE | 102010010578 B4 | 3/2014 | |
| DE | 102015118535 A1 | 5/2017 | |

* cited by examiner

HYDRAULIC-ELECTRIC DRIVE ARRANGEMENT FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements for work vehicles, and in particular to an arrangement for powering electric components via a hydraulic pump drive of a work vehicle.

BACKGROUND OF THE DISCLOSURE

Various work vehicles used in the agriculture, construction and forestry industries have heavy-duty hydraulic drives for powering large-scale work implements (e.g., booms, buckets, hoists, etc.) as well as for powering various components of the drivetrain (e.g., transmissions, final drives, etc.). Such work vehicles may also have electric machines for storing and supplying power to various components. For example, electric motors may be used to provide infinitely or continuously variable power to the drivetrain, or electric storage devices may be used to power auxiliary components (e.g., lights, winches and so on).

These hydraulic and electric components are ultimately powered by the prime mover of the work vehicle, typically an internal combustion engine (e.g., a diesel engine), which requires intervening coupling interfaces and various power conversion devices that may impact the efficiency of the machine and the cost and complexity of manufacture and assembly of the work vehicle.

SUMMARY OF THE DISCLOSURE

This disclosure provides a hydro-electric arrangement for powering electric components via a hydraulic pump drive of a work vehicle.

Specifically, one aspect the disclosure provides a hydraulic-electric drive assembly for a work vehicle having a prime mover. A hydraulic pump drive includes a manifold housing, a power input interface configured to couple with the prime mover for receiving rotational input power, and a plurality of power output interfaces coupled to the power input interface to transmit the input power from the prime mover mechanically at a first drive speed. At least one hydraulic pump is mounted to at least one of the power output interfaces to be driven by the input power from the prime mover. At least one electric generator is coupled to at least one of the power output interfaces to be driven by the input power from the prime mover. The at least one electric generator is configured to convert the input power from the prime mover into electric power.

Another aspect the disclosure provides a work vehicle having an engine and a hydraulic-electric drive assembly. The drive assembly includes a hydraulic pump drive having a manifold housing, a power input interface configured to couple with the engine for receiving rotational input power, and a plurality of power output interfaces coupled to the power input interface to transmit the input power from the engine mechanically at a first drive speed. At least one hydraulic pump is mounted to at least one of the power output interfaces to be driven by the input power from the prime mover. At least one electric generator is coupled to at least one of the power output interfaces to be driven by the input power from the prime mover. The at least one electric generator is configured to convert the input power from the prime mover into electric power.

Yet another aspect of the disclosure provides a drive assembly for a work vehicle having a prime mover. A hydraulic pump drive has a manifold housing, a power input interface configured to couple with the prime mover for receiving rotational input power, and a plurality of power output interfaces coupled to the power input interface to transmit the input power from the prime mover mechanically at a first drive speed. At least one hydraulic pump is mounted to at least one of the power output interfaces to be driven by the input power from the prime mover. At least one electric generator is coupled to at least one of the power output interfaces to be driven by the input power from the prime mover. The at least one electric generator is configured to convert the input power from the prime mover into electric power. The at least one electric generator has at least one electric machine and at least one gear set coupled between the at least one electric machine and the associated power output interface.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive arrangement, as shown in the accompanying figures of the drawings described briefly above. Various modifications to the example embodiments may be contemplated by one of skill in the art.

As used herein, the term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Modern work vehicles and other machines typically include sophisticated onboard systems for performing various work operations, including hydraulic and electric systems. It is common for such hydraulic systems to derive power from a prime mover or other power source of the work vehicle, such as an internal combustion engine, that also serves to power the drivetrain of, and thus propel, the work vehicle. One or more hydraulic pumps may be driven through mechanical input from the engine to pressurize the hydraulic system. The hydraulic pumps may interface with the engine drive shaft via a hydraulic pump drive that may act as a manifold for multiple hydraulic pumps that may be used in largescale work vehicle platforms. The hydraulic pumps may mount at predefined interface locations or "pads" of the pump drive manifold housing.

Electrically-powered components, on the other hand, may derive power from another power source, such as a storage battery, which may be replenished by electric generators and accumulators and the like. In all but purely electric machines, the generator may be mechanically-powered by the engine. Coupling an electric generator to an engine of a work vehicle introduces complexities (e.g., additional engine-generator interface components, or modifications to existing engine-generator interface components, and the associated space and cost requirements thereof) that may be avoided by the present disclosure.

The disclosure provides an improved arrangement for interfacing electric components with a mechanical (or chemo-mechanical) power source, and specifically for interfacing an electric generator for such electric components to the power source. More specifically, the disclosure provides a "hydraulic-electric" drive assembly with a hydraulic pump drive incorporating an electric generator for interfacing, and thereby powering, electric components with a prime mover (e.g., an internal combustion engine) of the work vehicle.

In certain embodiments, the hydraulic-electric drive assembly includes a manifold housing providing a power input interface at which the hydraulic-electric drive assembly mechanically couples to the prime mover, such as at a rotating drive shaft thereof. The hydraulic-electric drive also includes a plurality of power output interfaces by which the input interface (and thereby the prime mover) is coupled to at least one hydraulic pump and at least one electric generator. The output interfaces may be different or they may have a common configuration such that one hydraulic pump may be physically connected to any output interface, and likewise, any electric generator may be physically connected to any output interface (not otherwise connected to another hydraulic pump or electric generator) using a like mounting connection or hardware. For example, a common raised mounting surface or "pad" with a circular inner opening may be provided in the manifold housing as the mounting surface of each output interface.

In certain embodiments, one or more of the electric generators includes an electric machine (e.g., an electric motor or other stator/rotor assembly) and at least one gear set. The gear set has a positive gear ratio to mechanically generate a drive speed that is greater than a drive speed of the hydraulic pump drive, that is the rotational speed at which the output interface is driven by the prime mover via the input interface. By this, the gear set permits the hydraulic-electric drive assembly to drive (i.e., provide input power to) both the hydraulic pump(s) and the electric generator(s) using a common input power and a common input speed, while providing a relatively lower output speed and higher output torque to the hydraulic pumps as compared to higher output speed and lower output torque for operating the electric machine of the electric generator.

In certain embodiments, the gear set is coupled to the output interface (between the manifold housing and the electric machine), and may be in direct physical contact with the surface of the mounting pad. In certain embodiments, the gear set is a planetary gear set having a ring gear, a sun gear, and planet gears mounted to a carrier. The ring gear may couple to the output interface of the hydraulic pump drive, and each sun gear may couple to a rotor of the electric machine. The gear set may also include an input shaft coupled for co-rotation with the ring gear and configured to engage a drive gear of the output interface. The carrier may be fixed against rotation with respect to the housing of the gear set.

The disclosed drive assembly may be utilized in the context of a wide range of work vehicles, including, as mentioned, a sugarcane harvesting vehicle. In this regard, while a sugarcane harvester is illustrated and described herein as an example work vehicle, one skilled in the art will recognize that principles of the multi-speed drive arrangement disclosed herein may be readily adapted for use in other types of work vehicles, including, for example, various crawler dozer, loader, backhoe and skid steer machines used in the construction industry, as well as various other machines used in the agriculture and forestry industries, such as tractors, sprayers, skidders and the like. As such, the present disclosure should not be limited to applications associated with sugarcane harvesters or the particular example sugarcane harvester shown and described.

Figure 1:
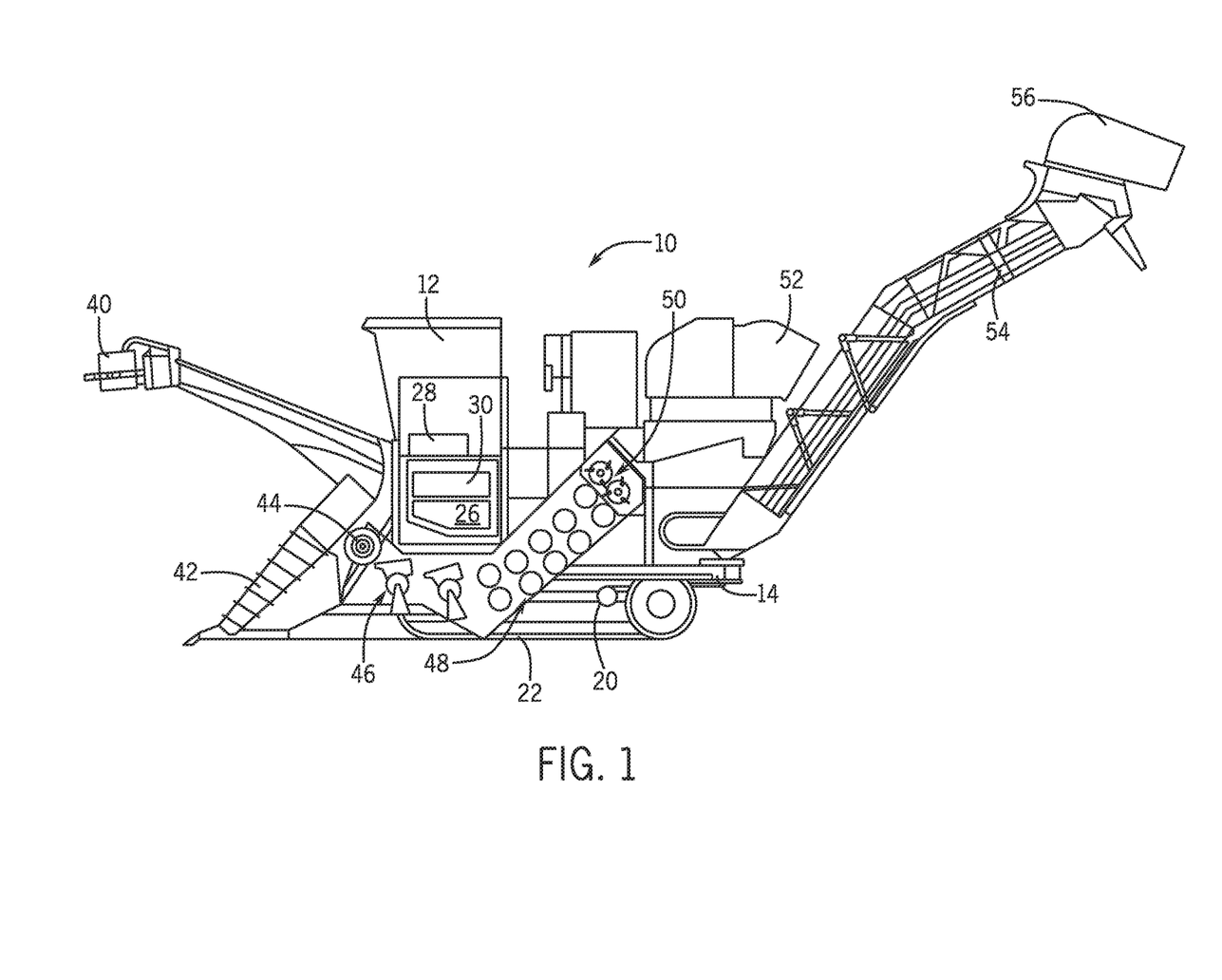
FIG. 1 is perspective view of a work vehicle in the form of a sugarcane harvesting vehicle in which electric components of the work vehicle may be powered by the hydraulic pump drive.

Referring now to FIG. 1, the disclosed drive arrangement may be implemented with regard to the example sugarcane harvester 10. The harvester 10 is presented in a side view in FIG. 1, with the front of the harvester 10 facing to the left such that certain right-side components of the harvester 10 are not be visible in FIG. 1. The harvester 10 may include a cab 12 to seat an operator, as well as a chassis 14, supporting various cutting, routing and processing devices. In certain embodiments, the chassis 14 may be supported by a transport frame such as track frame 20 supporting track assemblies 22. Other harvesters may include wheels supported by axle assemblies (not shown).

A cane topper 40 may extend forward of the chassis 14 in order to remove the leafy tops of sugarcane plants (not shown), and a set of crop dividers (e.g., left-side divider 42 shown in FIG. 1) may guide the remainder of the sugarcane toward internal mechanisms of the harvester 10 for processing. As the harvester 10 moves across a field, plants passing between the crop dividers 42 may be deflected downward by a knockdown roller 44 before being cut near the base of the plants by one of base cutters 46 supported by the chassis 14. Rotating disks, guides, or paddles (not shown) on the base cutters 46 may further direct the cut ends of the plants upwardly and rearward within the harvester 10 into a feed train for further transport and processing, for example, to successive upper and lower pairs of feed rollers 48 also supported by the chassis 14. The feed rollers 48 may then rotate in order to convey the stalks toward chopper drums 50 for chopping into relatively uniform billets. The chopper drums 50 may rotate in opposite directions, with respect to each other, in order to chop the passing stalks into billets and propel the billets into a cleaning chamber at the base of a primary extractor 52. The primary extractor 52 may utilize a powered fan to extract trash and debris from the cleaning chamber, while allowing the billets of sugarcane stalks to drop onto a loading elevator 54 with a forward end located at the bottom of the cleaning zone. The loading elevator 54 may then convey the cleaned billets upward to a discharge location, below a secondary extractor 56, where the billets may be discharged into a trailing truck or other receptacle (not shown).

An engine 26 may supply power for driving the harvester 10 along a field and for powering various driven components of the harvester 10. A storage battery 28 may be included on the harvester 10 for providing electric ignition in the event the engine 26 requires a spark for combustion. The storage battery 28 may also be used to supplement or supplant the engine 26 in powering various electric components of the harvester 10. In certain embodiments, the engine 26 may directly power a component drive unit 30. Various driven components of the harvester 10 may be powered by hydraulic motors (not shown) and electric motors (not shown) receiving power from the drive unit 30, in the manner described below.

Various devices within the harvester 10 may be driven via hydraulic motors that are indirectly powered by the engine 26. For example, rotation of the cutting blades of the base cutters 46 and the chopper drums 50 may be driven by one or more hydraulic motors (not shown) on one or more closed-loop hydraulic circuits (not shown), which may in turn be powered through the drive unit 30 driven by the engine 26. The hydraulic circuit(s) for the base cutters 46 may be shared with or distinct from the hydraulic circuit(s) for other harvesting devices (e.g., the feed rollers 48 or other devices).

Various other devices within the harvester 10 may be driven via electric motors that are indirectly powered by the engine 26. For example, rather than using hydraulic power, the cutting blades of the base cutters 46 and the chopper drums 50 may be driven by one or more electric motors (not shown) on one or more closed-loop electric circuits (not shown), which may in turn be powered through the drive unit 30 driven by the engine 26. The electric circuit(s) for the base cutters 46 may be shared with or distinct from the electric circuit(s) for other harvesting devices (e.g., the feed rollers 48 or other devices).

Figure 2:
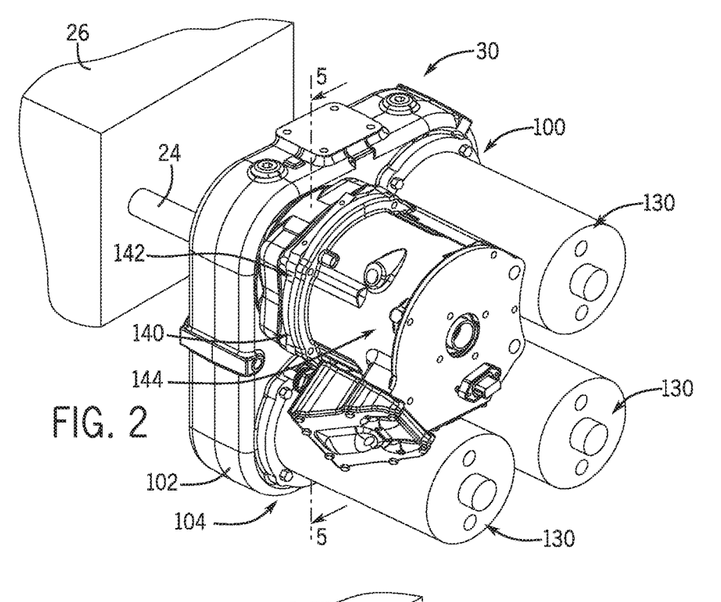
FIG. 2 is a perspective, exterior overview of an example hydraulic pump drive arrangement according to the present disclosure having one electric generator and three hydraulic pumps mounted to a manifold housing of the hydraulic pump drive.
Figure 3:
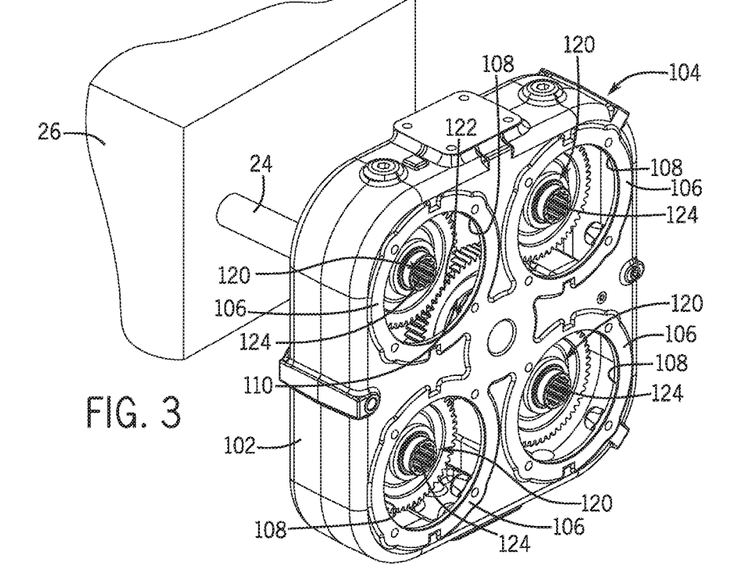
FIG. 3 is a view similar to FIG. 2 showing the hydraulic pump drive without the electric generator and hydraulic pumps.
Figure 4:
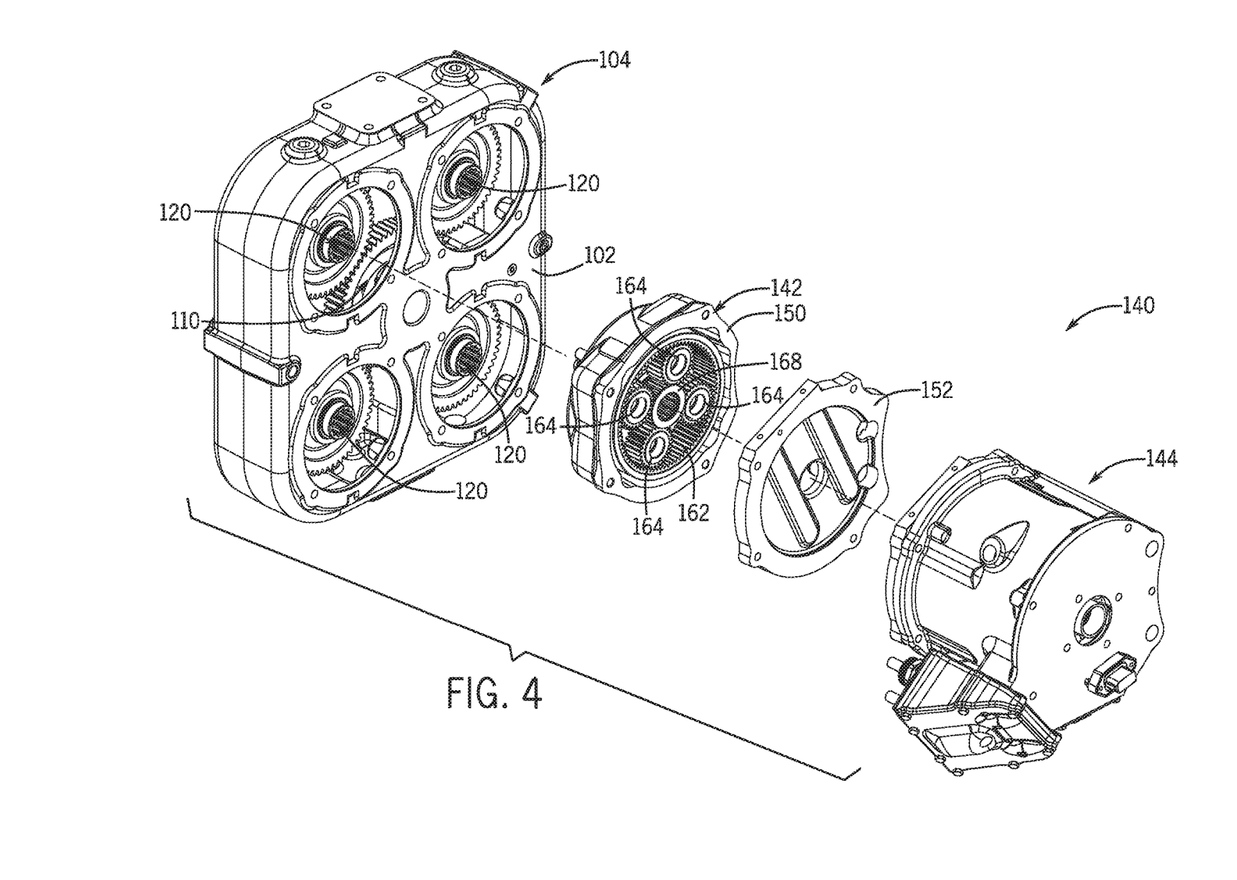
FIG. 4 is an exploded assembly view showing the hydraulic pump drive manifold housing and the electric generator, including an intermediate planetary gear set and an electric motor.

Referring now also to FIGS. 2-4, an example hydraulic-electric drive arrangement 100 included in the drive unit 30 that couples to the engine 26 and receives input power via a drive shaft 24. The drive shaft 24 is coupled to an input interface 110 of the hydraulic-electric drive arrangement 100 so as to transfer power to each of a plurality of output interfaces 120. In the illustrated example, a splined connection (not shown) couples the input interface 110 to the drive shaft 24 for corotation therewith so as to receive the power (rotational speed and torque) imparted to the drive shaft 24 from the engine 26. The input interface 110 in turn transfers the received power (i.e., the rotational speed and torque) to the output interfaces 120 via intermeshing of teeth at the peripheries of the input 110 and output 120 interfaces, such as at meshing area 122 shown in FIG. 3. The input interface 110 will impart a nominal fractional power output to each output interface 120 in accordance with the number of output interfaces present. In the illustrated example, there are four output interfaces 120, each nominally receiving one-fourth of the power from the input interface 110. Further, each output interface 120 may have the same or different power output as one another depending on their relative tooth counts, and depending on the relative tooth count of the respective input 110 and output 120 interfaces (i.e., the gear ratio), the output interfaces 120 may have the same or different rotational speed as the input interface 110. In the illustrated example, each output interface 120 is identical. The common tooth count effects the same gear ratio with respect to the input interface 110 for each of the four output interfaces 120, and thus each output interface 120 provides the same output power (rotational speed and torque). In the example configuration, the input interface 110 has a greater tooth count than each of the output interfaces 120, and thus the quarter power distribution is effected through a common higher speed, lower torque power flow through each output interface 120. In the example configuration, this power is transferred through a splined annulus 124 that rotates about an associated rotation axis, each of which is generally in parallel with one another and a rotation axis in common with the drive shaft 24 and the input interface 110.

As depicted, the input interface 110 and the four output interfaces 120 of the example hydraulic-electric drive arrangement 100 may contained within and/or mounted to a manifold housing 102, which together may form what may be conventionally considered a "hydraulic pump drive" 104. However, here, the hydraulic pump drive 104 in fact serves to drive both hydraulic and electric components. Specifically, in the example configuration, there are three hydraulic pumps 130 and one electric generator 140. It should be understood, however, that various combinations of hydraulic and electric components could be incorporated into the disclosed arrangement, including multiples of both hydraulic and electric components or a single hydraulic component and multiple electric components.

The hydraulic and electric components may mount directly to the manifold housing 102, or couple thereto via intermediate mounting or other components. Further, the hydraulic and electric components may mount to the manifold housing 102 by direct or indirect connection to an outer mounting surface or "pad" 106. In the illustrated example, each mounting pad 106 is defined by a raised ring circumscribing an opening 108 in the manifold housing 102 for each output interface 120. Each mounting pad 106 may be different, such as configured in a complementary fashion to mate with a specific hydraulic or electric component. Alternatively, the mounting pads 106 may have a common configuration, such as in the example embodiment, in which case any one of the output interfaces 120 could accommodate any hydraulic or electric component having a complementary (common) mating surface. Thus, any of the output interfaces 120 could couple to, and any of the mounting pads 106 could mount, any one of the hydraulic pumps 130 and the electric generator 140.

Each of the three hydraulic pumps 130 may be any suitable conventionally-configured hydraulic pump, such as an axial piston pump, with a splined or toothed shaft to couple with the of the annulus 124 of the output interface 120 and a common complementary mating surface to that of the mounting pads 106 and which may be bolted directly to the manifold housing 102. As such, the construction and mounting of the hydraulic pumps 130 will not be detailed here. The output interfaces 120 may provide the requisite gear ratio (speed and torque) for driving the hydraulic pumps 130 directly.

The electric generator 140, on the other hand, may operate at significantly different speed and torque requirements (e.g., running at a relatively higher speed and lower torque) than the hydraulic pumps 130. To facilitate this, the electric generator 140 includes a gear box 142 that provides the requisite gear ratio for its electric machine 144. Like the hydraulic pumps 130, the electric machine 144 of the electric generator 140 may be any suitable conventional electric generator or motor, such as an induction generator, having a shaft turning a rotor with respect to a stator. The electric machine 144 will thus not be detailed here.

Figure 5:
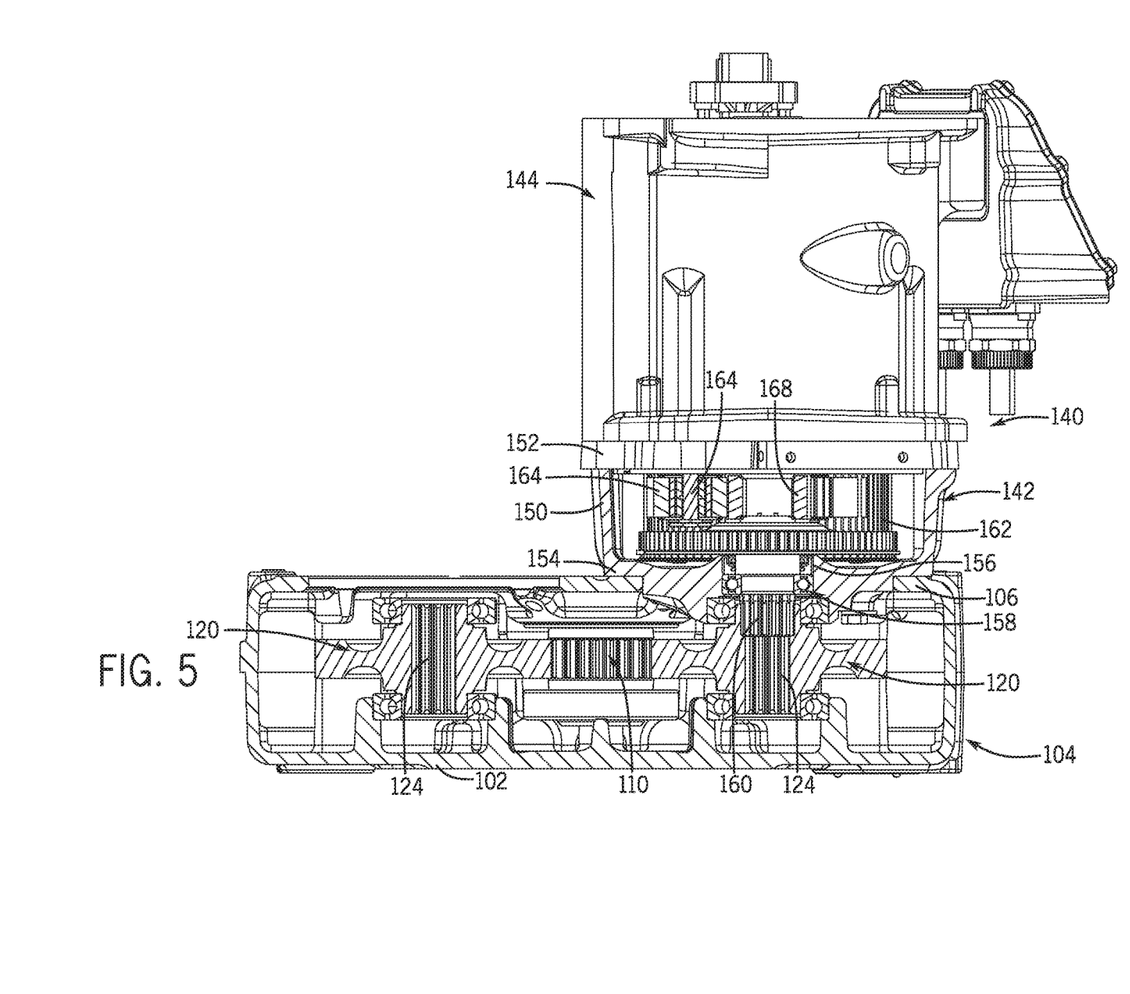
FIG. 5 is an assembled view of the components shown in FIG. 4 with the features along line 5-5 of FIG. 2 shown in cross-section.

Referring also to FIG. 5, the gear box 142 may any suitable gear mechanism providing the requisite gear ratio, such a positive gear ratio stepping up the rotational speed and reducing the torque relative to that input from the engine 26. In the example embodiment, the gear box 142 is a planetary gear set, and in particular, a ring-in, sun-out, fixed-carrier, single-stage planetary gear set. Specifically, the gear set includes a gear housing 150, defining an open ended gear chamber, and an end plate 152, mounted to the gear housing 150 to close the gear chamber. The end plate 152 attaches to the gear housing 150 and to a housing for the electric machine 144 via mechanical fasteners (e.g., bolts) or other connection techniques. The end plate 152 provides a raised mounting surface or pad for the electric machine 144 in a manner similar to the mounting pads 106 of the manifold housing 102. Opposite its open end, the gear housing 150 defines another mounting surface 154 of a complementary configuration to that of the associated mounting pad 106, such that, the gear housing 150 mounts directly to (i.e., is in physically abutting relation with) the manifold housing 102. This end of the gear housing 150 also projects into the manifold housing 102 through the associated opening 108 and may be secured to the manifold housing 102 by mechanical fasteners, welding or other connection techniques. This end of the gear housing 150 also has a central opening 156 in which various bearings 158 are mounted that support a hub 160 of a ring gear 162 for rotation with respect to the gear housing 150. The ring gear hub 160 is configured to couple with the associated output interface 120, for example, by external splines that mate with internal splines of the output interface 120. The internal teeth (or splines) of the ring gear 162 mate with teeth (or splines) of a set (e.g., four) planet gears 164, which are mounted for rotation by a fixed carrier 166 (and thus do not orbit) and which engage the teeth (or splines) of a sun gear 168. As shown, the planet carrier 166 may be a unitary part of the end plate 152 or secured thereto in a fixed manner by any suitable mechanical fastener or other connection technique. The sun gear 168 may be a unitary part of, or fixed to, the shaft of the electric machine 144.

In the example configuration then, power flow to the electric machine 144 is as follows. Rotation input from the engine 26 is transmitted via the drive shaft 24 to the input interface 110 of the hydraulic-electric drive assembly 100. Engagement of the teeth at the periphery of the input interface 110 and the periphery of the associated output interface 120 transmits this rotational power to the ring gear hub 160 by the engaged splines, and at the same time splits the power and effects a gear ratio change to the speed and torque of the apportioned power. The ring gear 162 rotates at the resulting speed and torque and transmits power to planet gears 164, which in turn transmit power to the sun gear 168. Engagement of the planet gears 164 by the ring gear 162 and their engagement of the sun gear 168 effect a gear ratio change in speed and torque transmitted to the shaft of the electric machine 144, which rotates the rotor therein. In the example embodiment, the positive gear ratio of the gear set steps of the speed (e.g., by a multiple of 3 or so) and reduces the torque between the output interface 120 and the sun gear 168, which allows the electric machine 144 to operate at higher speeds, and lower torque as compared to the hydraulic pumps 130.

There has thus been provided example embodiments of a hydraulic-electric drive arrangement, which is suitable for driving both hydraulic and electric components of a work vehicle. The hydraulic and electric components are coupled to the prime mover (e., an engine) via one or more intermediary components. In certain embodiments, both the hydraulic components and the electric components may be coupled to power through the input and output interfaces of a shared manifold housing, such as that used in hydraulic pump drive units. In certain embodiments, the interface of the hydraulic and electric components may be of a common, or identical, configuration such that either a hydraulic component or an electric component may be coupled to any interface. Moreover, in certain embodiments there may be a single hydraulic component and a single electric component, or there may be multiple of either or both. In certain embodiments, each hydraulic component is a hydraulic pump and each electric component is an electric generator, which is configured to transmit electric power to a downstream electric component of the work vehicle. The electric generator may incorporate a conventional electric machine and a gear set that effects a gear ratio as needed to deliver an appropriate speed and torque to the electric machine. The speed and torque at which the electric machine may be different (e.g., higher speed and lower torque) than that at which a hydraulic pump is driven. In this way, additional hardware, which would otherwise significantly enlarge the space envelope and increase the complexity and cost of the drive, may be minimized or avoided.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A hydraulic-electric drive assembly for a work vehicle having a prime mover, comprising:
 a hydraulic pump drive having:
  a manifold housing;
  a power input interface configured to couple with the prime mover for receiving rotational input power; and
  a plurality of power output interfaces coupled to the power input interface to transmit the input power from the prime mover mechanically at a first drive speed;
 at least one hydraulic pump mounted to at least one of the power output interfaces to be driven by the input power from the prime mover; and
 at least one electric generator coupled to at least one of the power output interfaces to be driven by the input power from the prime mover, the at least one electric generator configured to convert the input power from the prime mover into electric power
 wherein the at least one electric generator includes at least one electric machine and at least one gear set coupled to the associated one of the plurality of power output interfaces;
 wherein the manifold housing defines a common mounting pad for each of the power output interfaces; and
 wherein the at least one hydraulic pump and the at least one gear set each includes a housing defining a common mounting interface of a complementary configuration for mating with the associated mounting pad.

2. The drive assembly of claim 1,
 wherein the at least one gear set has a positive gear ratio to mechanically generate a second drive speed that is greater than the first drive speed of the hydraulic pump drive.

3. The drive assembly of claim 2, wherein the at least one gear set is mounted directly to the manifold housing.

4. The drive assembly of claim 1, wherein the at least one gear set is a planetary gear set having a ring gear, a sun gear, and planet gears mounted to a carrier; and
 wherein the ring gear couples to the associated power output interface of the hydraulic pump drive and the sun gear couples to a rotor of the associated electric machine.

5. The drive assembly of claim 4, wherein the at least one gear set includes an input shaft coupled for co-rotation with the ring gear and configured for engagement with a drive gear of the associated power output interface.

6. The drive assembly of claim 5, wherein the carrier is fixed against rotation with respect to the housing of the associated gear set.

7. A work vehicle, comprising:
 an engine; and
 a hydraulic-electric drive assembly, including:
  a hydraulic pump drive having:
   a manifold housing;
   a power input interface configured to couple with the engine for receiving rotational input power; and
   a plurality of power output interfaces coupled to the power input interface to transmit the input power from the engine mechanically at a first drive speed;
  at least one hydraulic pump mounted to at least one of the power output interfaces to be driven by the input power from the prime mover; and
  at least one electric generator coupled to at least one of the power output interfaces to be driven by the input power from the prime mover, the at least one electric generator configured to convert the input power from the prime mover into electric power;
 wherein the at least one electric generator includes at least one electric machine and at least one gear set coupled to the associated one of the plurality of power output interfaces;
 wherein the manifold housing defines a common mounting pad for each of the power output interfaces; and
 wherein the at least one hydraulic pump and the at least one gear set each includes a housing defining a common mounting interface of a complementary configuration for mating with the associated mounting pad.

8. The work vehicle of claim 7,
 wherein the at least one gear set has a positive gear ratio to mechanically generate a second drive speed that is greater than the first drive speed of the hydraulic pump drive.

9. The work vehicle of claim 8, wherein the at least one gear set is mounted directly to the manifold housing.

10. The work vehicle of claim 7, wherein the at least one gear set is a planetary gear set having a ring gear, a sun gear, and planet gears mounted to a carrier; and
 wherein the ring gear couples to the associated power output interface of the hydraulic pump drive and the sun gear couples to a rotor of the associated electric machine.

11. The work vehicle of claim 10, wherein the carrier is fixed against rotation with respect to the associated housing.

12. A drive assembly for a work vehicle having a prime mover, comprising:
 a hydraulic pump drive having:
  a manifold housing;
  a power input interface configured to couple with the prime mover for receiving rotational input power; and
  a plurality of power output interfaces coupled to the power input interface to transmit the input power from the prime mover mechanically at a first drive speed;
 at least one hydraulic pump mounted to at least one of the power output interfaces to be driven by the input power from the prime mover; and
 at least one electric generator coupled to at least one of the power output interfaces to be driven by the input power from the prime mover, the at least one electric generator configured to convert the input power from the prime mover into electric power, and the at least one electric generator having:
  at least one electric machine; and
  at least one gear set coupled between the at least one electric machine and the associated one of the plurality of power output interfaces;
 wherein the manifold housing defines a common mounting pad for each of the power output interfaces; and
 wherein the at least one hydraulic pump and the at least one gear set each includes a housing defining a common mounting interface of a complementary configuration for mating with the associated mounting pad.

13. The drive assembly of claim 12, wherein each gear set has a positive gear ratio to mechanically generate a second drive speed that is greater than the first drive speed of the hydraulic pump drive.

14. The drive assembly of claim 12, wherein the at least one gear set is mounted directly to the manifold housing.

15. The drive assembly of claim 12, wherein the at least one gear set is a planetary gear set having a ring gear, a sun gear, and planet gears mounted to a carrier; and     wherein the ring gear couples to the associated power output interface of the hydraulic pump drive and the sun gear couples to a rotor of the associated electric machine.

16. The drive assembly of claim 15, wherein the carrier is fixed against rotation with respect to the associated housing.

17. The drive assembly of claim 16, wherein the at least one gear set includes an input shaft coupled for co-rotation with the ring gear and configured for engagement with a drive gear of the associated power output interface.

\* \* \* \* \*